Oct. 18, 1949.   A. B. GUISE ET AL   2,484,943
NOZZLE FOR SPRAYING DRY CHEMICALS
Filed March 28, 1946   7 Sheets-Sheet 1
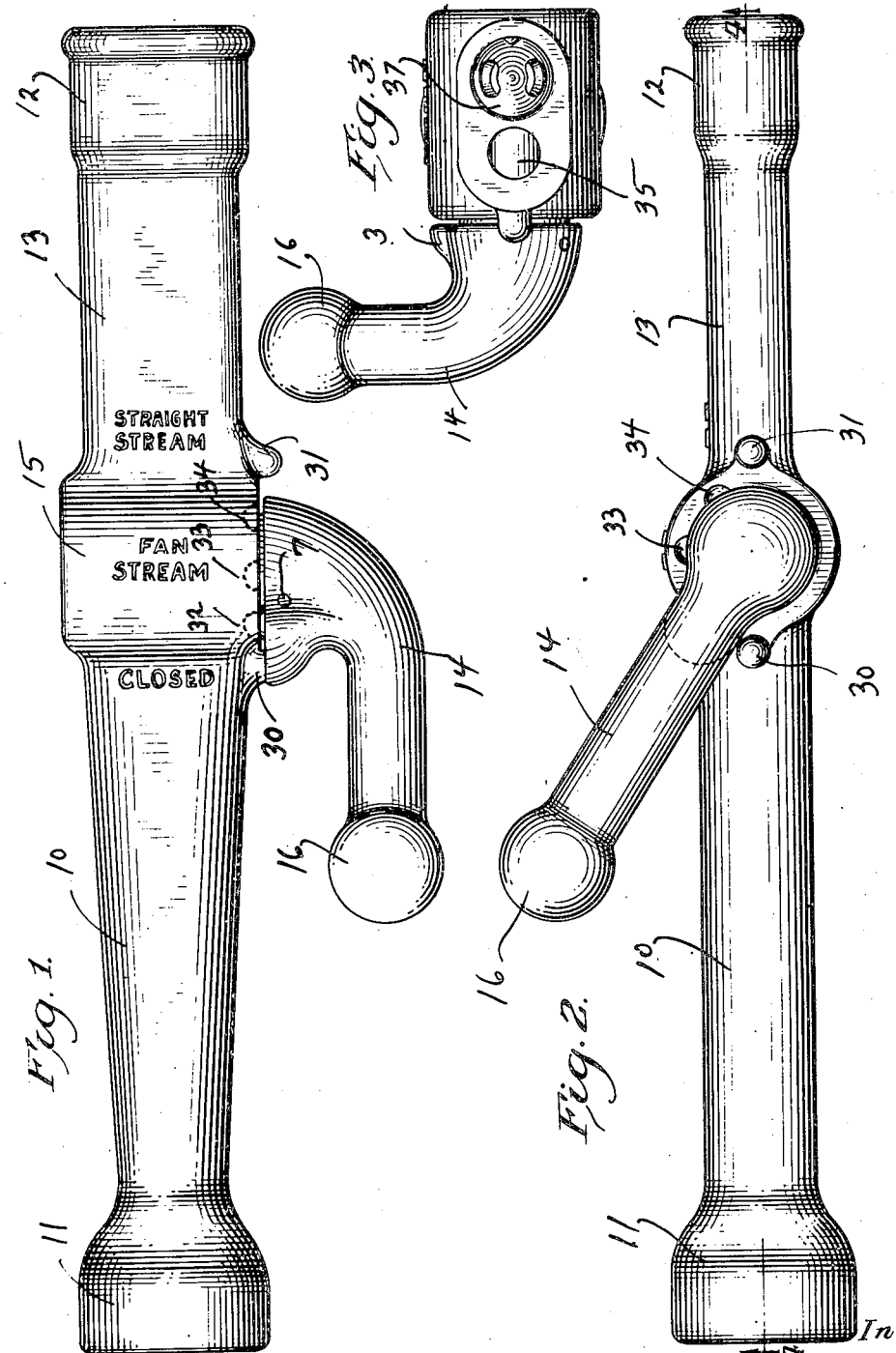
Inventors
Arthur B. Guise
and Theodore W. Johnson
By Joseph Rossman
Atty.

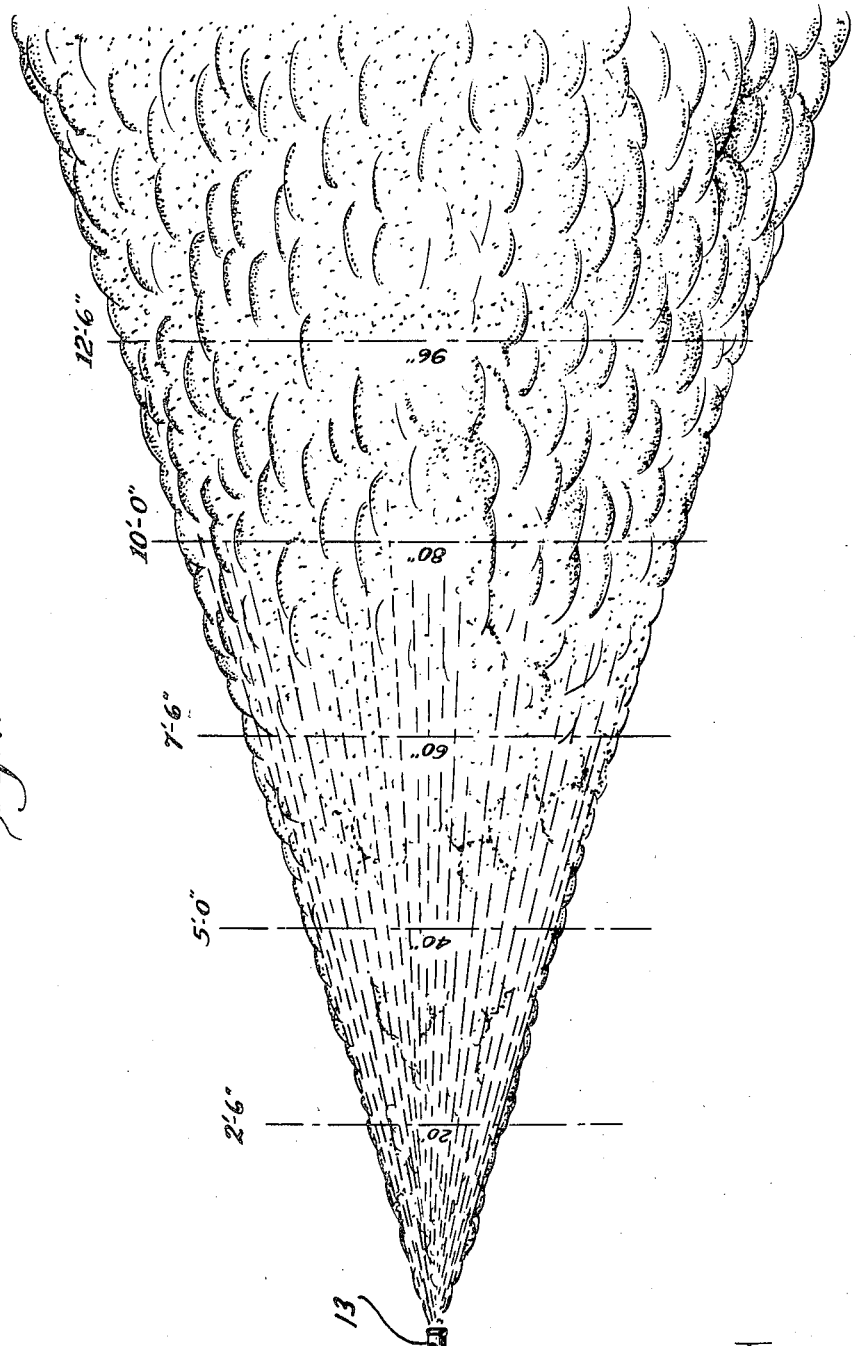

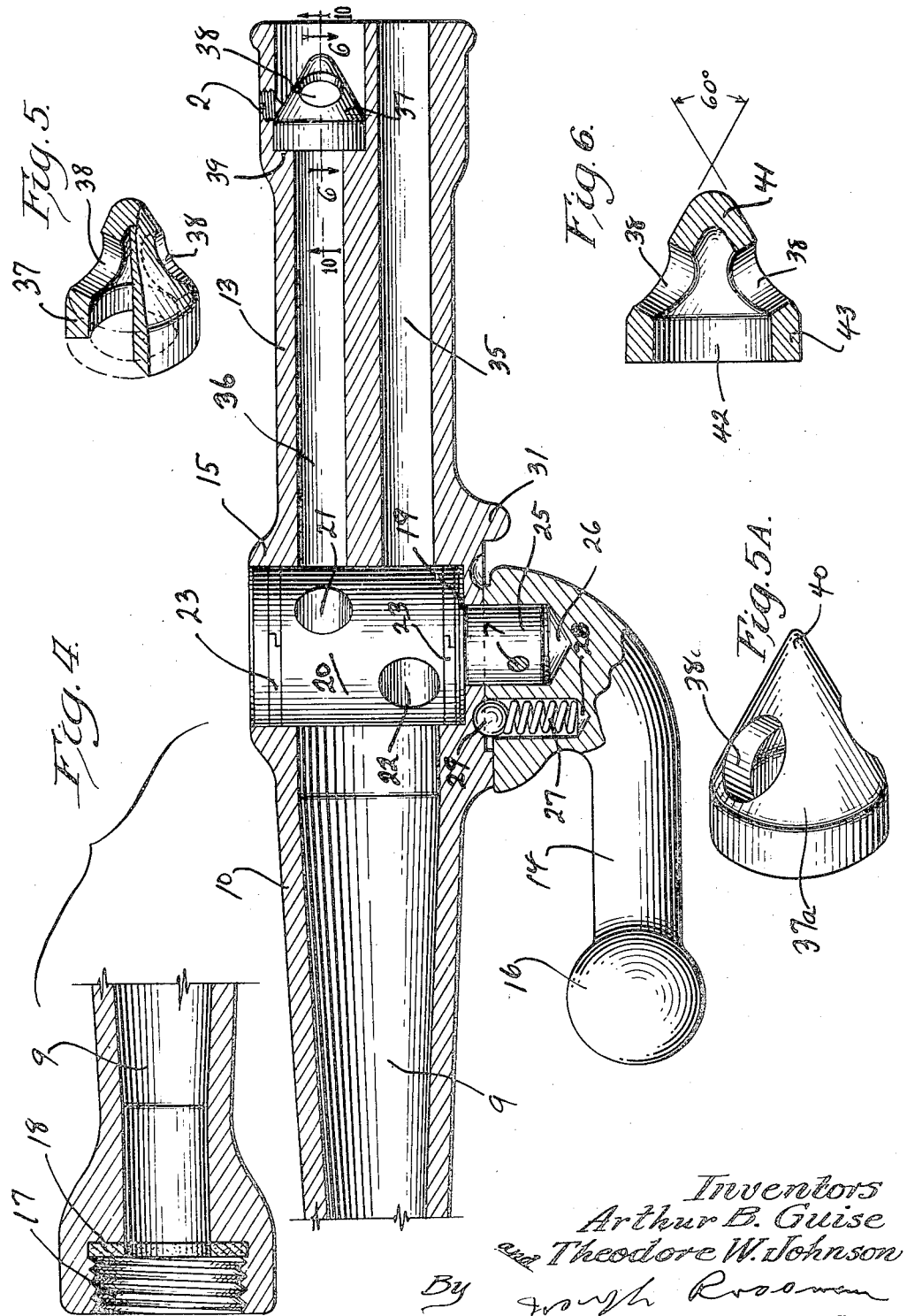

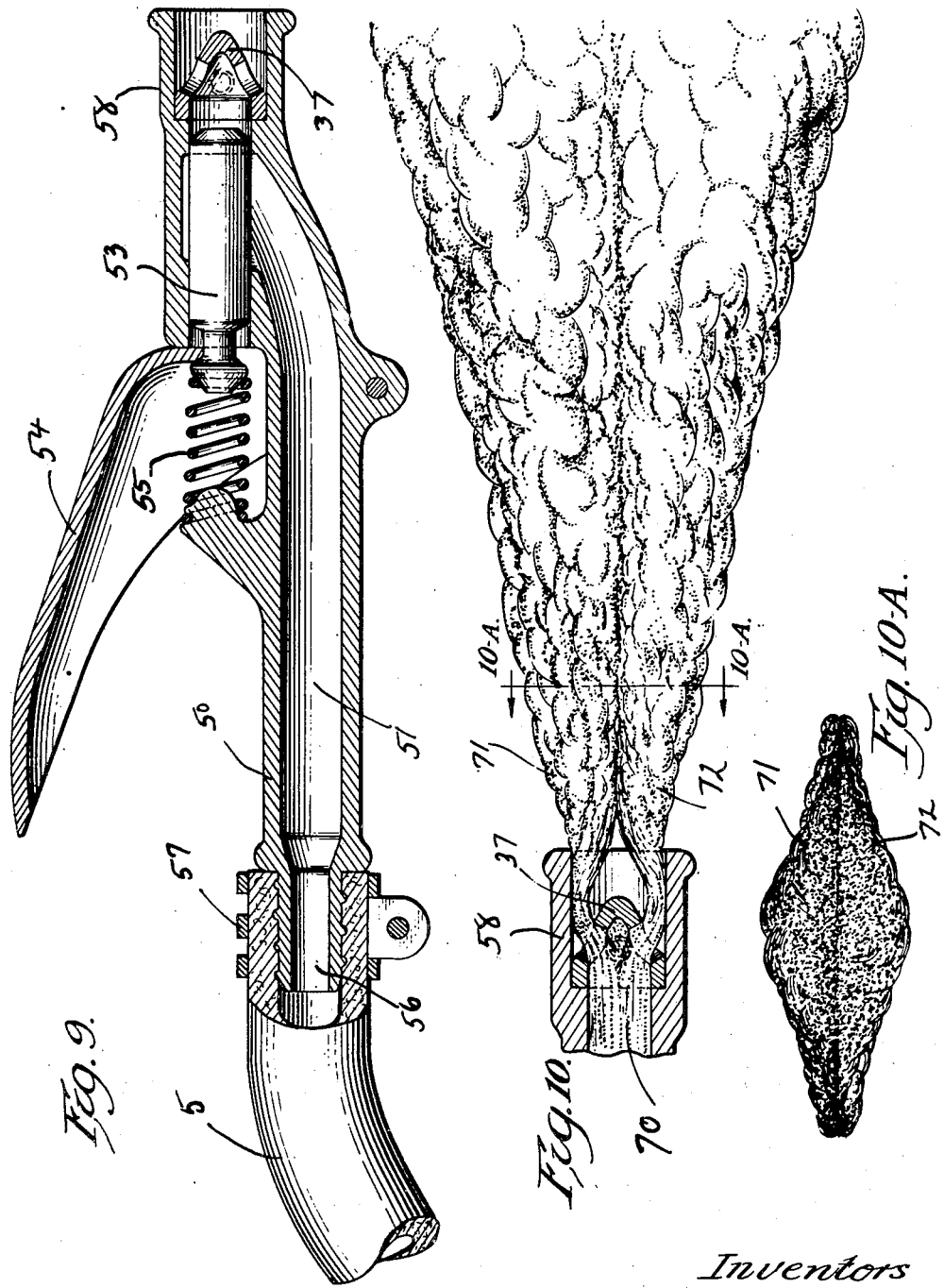

Oct. 18, 1949.  A. B. GUISE ET AL  2,484,943
NOZZLE FOR SPRAYING DRY CHEMICALS
Filed March 28, 1946  7 Sheets-Sheet 6

Inventors
Arthur B. Guise
and Theodore W. Johnson
By Joseph Rossman
Atty.

Oct. 18, 1949.  A. B. GUISE ET AL  2,484,943
NOZZLE FOR SPRAYING DRY CHEMICALS
Filed March 28, 1946  7 Sheets-Sheet 7

Inventor
Arthur B. Guise
and Theodore W. Johnson
By Joseph Rossman
Atty.

Patented Oct. 18, 1949

2,484,943

UNITED STATES PATENT OFFICE

2,484,943

NOZZLE FOR SPRAYING DRY CHEMICALS

Arthur B. Guise and Theodore W. Johnson, Marinette, Wis., assignors to Ansul Chemical Company, Marinette, Wis., a corporation of Wisconsin Application March 28, 1946, Serial No. 657,658

4 Claims. (Cl. 169—1)

This invention relates to a nozzle construction for producing streams of predetermined shape and velocity. More specifically, the invention relates to the production of streams of comminuted free-flowing fire extinguishing dry chemical. The nozzle construction of the present invention is particularly adapted for producing streams of powdered dry chemical adapted for extinguishing gasoline, kerosene and paraffin oil fires, the dry chemical being propelled through the nozzle by an inert gas, such as nitrogen or carbon dioxide under high pressure. The novel features of the invention can be embodied in various types of nozzle constructions, two illustrative embodiments of which are given in the following specification.

Figure 8:
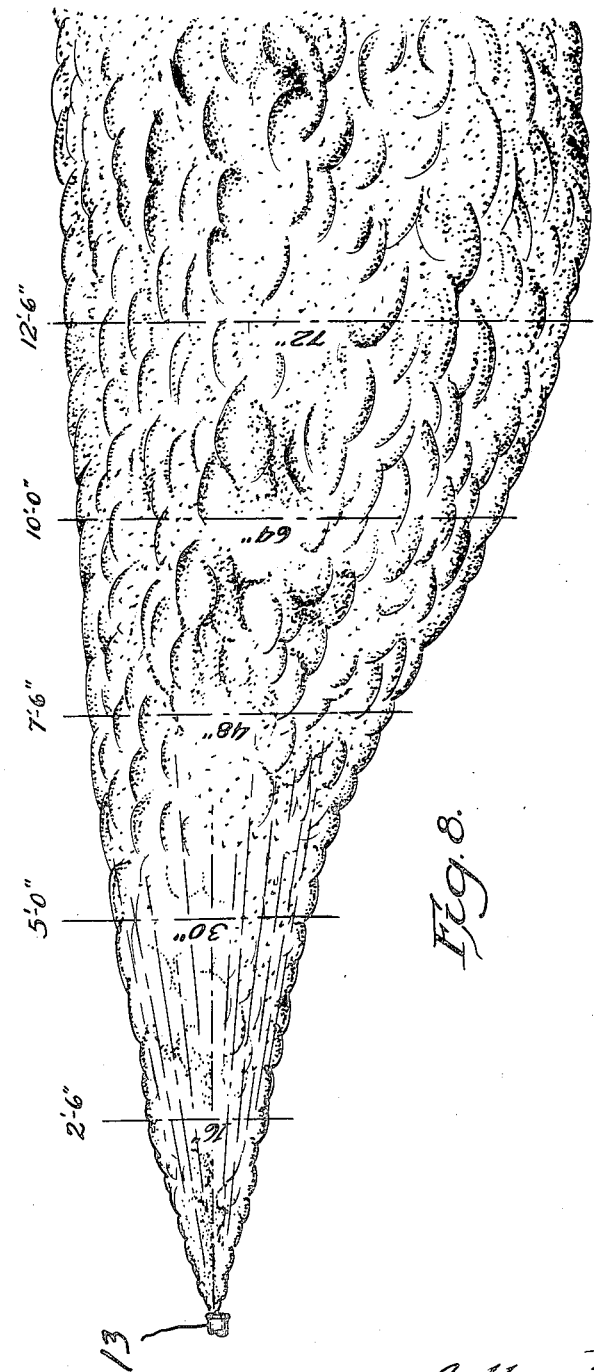
Figure 11:
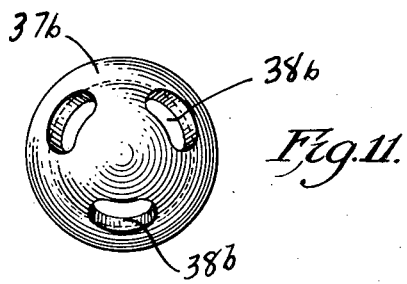
Figure 12:
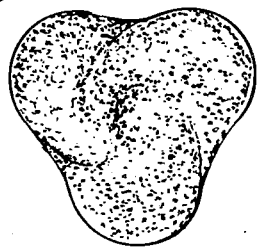
Figure 13:
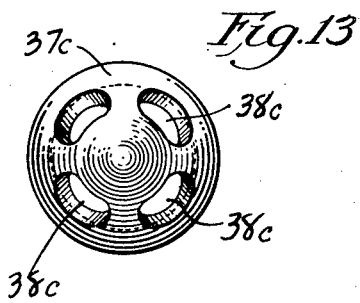
Figure 14:
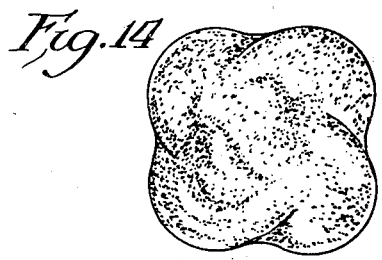
Figure 15:
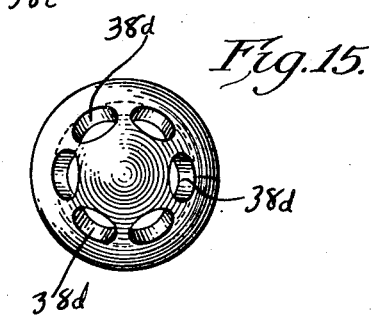
Figure 16:
Figure 17:
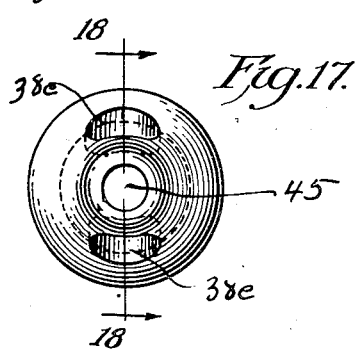
Figure 18:
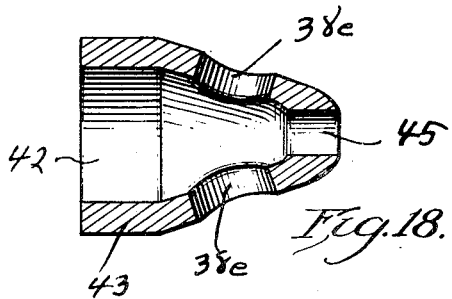
Figure 19:
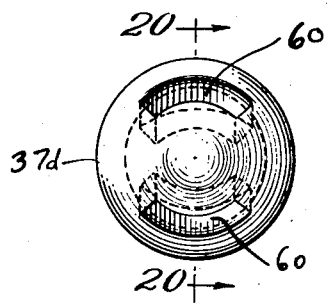
Figure 20:
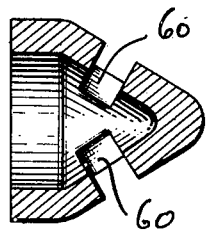
Figure 21:
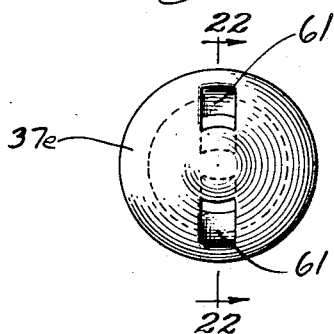
Figure 22:
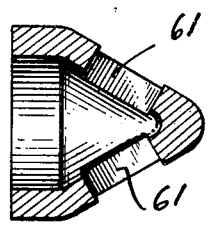

Further objects and advantages of the invention will be apparent from the following specification and drawings wherein, Figure 1 is a side view of one specific type of nozzle embodying the novel features of the present invention, Figure 2 is a plan view of the nozzle, Figure 3 is a front end view of the discharge end of the nozzle, Figure 4 is an enlarged partly broken vertical sectional view of the nozzle showing the valve in closed position, Figure 5 is a perspective view, partly broken away, of the nozzle tip, Figure 5A is a perspective view of a modified form of the nozzle tip, Figure 6 is a sectional view taken on lines 6—6 of Figure 4, Figure 7 is a plan view of a fan-shaped stream of dry chemical produced by the nozzle, Figure 8 is a side view of the same stream of dry chemical to show its contour, Figure 9 is a vertical sectional view of another nozzle construction embodying the novel features of the present invention, Figure 10 is a fragmental enlarged sectional view of the nozzle mouth illustrating the stream emission, Figure 10A is a sectional view taken on lines 10A—10A of Figure 10, Figure 11 is a plan view of a modified nozzle tip construction having three orifices, Figure 12 is a transverse sectional view of a stream produced by using the nozzle tip shown in Figure 11, Figure 13 is a plan view of another nozzle tip having four equally spaced orifices, Figure 14 is a transverse sectional view of a stream produced by using the nozzle tip shown in Figure 13, Figure 15 is a plan view of a modified nozzle tip having six equally spaced orifices, Figure 16 is a transverse sectional view of a stream produced by using the nozzle tip shown in Figure 15, Figure 17 is a plan view of another modified form of a nozzle tip, Figure 18 is a sectional view taken on lines 18—18 of Figure 17, Figure 19 is a plan view of a further modified nozzle tip construction, Figure 20 is a sectional view taken on lines 20—20 of Figure 19, Figure 21 is a plan view of still another modified nozzle tip construction, and Figure 22 is a sectional view taken on lines 22—22 of Figure 21.

Referring to the drawings, one form of nozzle construction embodying the present invention is shown in Figures 1 to 4 which illustrate a dual-stream type of nozzle construction provided with a rotatable plug type valve controlled by an exterior handle which permits the dry chemical to discharge selectively either through a smooth bore cylindrical discharge opening for producing a straight stream, or through another discharge channel opening provided with a nozzle tip construction embodying the novel features of the present invention for producing a fan-shaped stream.

The dual-stream nozzle is constructed of metal, preferably of a corrosion-resistant aluminum alloy in the form of a tubular hollow body 10 of the general contour illustrated in Figures 1 and 2 having a smooth cylindrical internal intake bore 9 terminating in a socket portion 11 which is provided with threads 17 internally thereof for coupling to a suitable hose which is connected to a suitable source of gas pressure for feeding dry powdered chemical to the bore 9 of the nozzle. A gasket 18 is seated in the base of the socket to make a fluid tight connection.

The body 10 of the nozzle increases slightly in taper and enlarges to a substantially cylindrical chamber 15 open at the top and bottom for seating therein a cylindrical rotatable valve plug 20 which fits snugly therein. Plug 20 is provided with a cylindrical stem 25, as shown in Figure 4, which projects outwardly of the nozzle body and is fastened by a locking pin to handle 14. Handle 14 is provided with a cylindrical bore 26 for snugly receiving the extension 25 of the plug 20. An enlarged terminal knob 16 is provided on the handle for facilitating grasping and moving same to any desired position. Handle 14 is provided with an integral stop portion 3 which is adapted to contact stop-lugs 30 and 31 respectively at the extreme left position as shown in Figure 4, or at the extreme right position.

The lower face of the cylindrical portion 15 is provided with three spaced semi-spherical indents or depressions 32, 33 and 34 which are adapted to slidably receive a lock indent ball 29 retained in a cylindrical bore 28 provided in the handle 14 which is normally actuated upwardly by a coil spring 27 positioned within the bore 28. The lock indent ball serves to releasably lock the handle 14 at three different positions as determined by the location of the indents 32, 33 and 34.

Valve plug 20 is circumferentially channeled adjacent its upper and lower ends for receiving cast iron tin-plated piston-type split rings 23 which serve to seal the lateral bearing surfaces of the plug against escape of any dry chemical at this region. The dry chemical retained at the piston rings in turn serves to minimize gas leakage at this region. A stainless steel washer 19 is interposed below the base of the plug 20 and plug seat, to seal the plug as well as to facilitate its rotation by minimizing any binding action that might otherwise occur between the plug and its seat.

The plug 20 is provided with two drilled passageways or ports, indicated by numerals 21 and 22, which are positioned so that the longitudinal axes thereof are located at an angle of about 60° to each other. The upper port 21 is adapted to be aligned with a channel or passage 36 in the forward discharge portion 13 of the nozzle by rotating handle 14 so as to cause plug 20 to assume the intermediate position, at which position the lock indent ball 29 will be engaged in the intermediate indent opposite the words "fan stream" as shown in Figure 1. By rotating the handle 14 to the extreme right position or "straight stream" position port 22 will be aligned with the lower smooth bore cylindrical discharge stream channel 35. At this position the lock indent ball 29 will be engaged in indent 34 and stop portion 3 of the handle will contact stop-lug 31. If it is desired to shut off communication with both the upper and lower stream channels the handle is moved to the extreme left or "closed" position shown in Figures 1 and 4, at which position stop portion 3 of the handle 14 is in contact with lug 30 and lock indent ball 29 is engaged in indent 32. The valve plug 20 will then assume the position shown in Figure 4 so that communication with the intake portion 9 of the nozzle and forward discharge portion 13 is cut off.

Upper stream channel 36 is provided with a conical plug or nozzle tip 37 positioned inwardly of the discharge mouth of the nozzle and is retained in seat 39 by a setscrew 2 provided in the exit chamber 12 of the nozzle. The nozzle tip 37 has two substantially circular orifices 38 diametrically opposite each other and perpendicular to the tapered portion as shown in Figures 5 and 6. When handle 14 is moved to its intermediate position so as to align port 21 of valve plug 20 only with stream channel 36, dry chemical supplied under pressure from a hose 5 will be expelled through the orifices 38. The discharge of dry chemical through these orifices and impingement of the dry chemical against the internal cylindrical walls adjacent the mouth of the nozzle results in the emission of a low velocity flat fan-shaped stream of dry chemical having the contour shown in Figures 7 and 8 as will be more fully explained later.

The lower stream channel 35 is a straight unobstructed cylinder bore which is adapted to produce a stream of dry chemical of a straight or normal contour, that is, substantially circular in cross-section. This stream has a relatively high velocity and long range as compared with the fan-shaped stream emissable from channel 36 which is of shorter range. When the handle 14 is moved to the extreme right the port 22 of valve plug 20 will communicate only with the stream channel 35 and no chemical will be fed to the upper channel 36.

It will thus be understood that the valve plug 20 and handle 14 have three positions, namely: closed, fan stream or relatively low velocity, and straight stream or relatively high velocity. The handle 14 is releasably locked by the spring and ball indent and can be released from any one of its three positions by applying manual pressure on the handle to release the indent ball from its locked position so as to permit the handle to be moved to any other desired position.

A second type of nozzle construction embodying the present invention is illustrated in Figure 9, wherein the nozzle body 50 has its intake end 56 externally threaded for insertion in the end of a supply hose 5 connected to a source of dry chemical suspended in a gas under pressure. The hose is clamped securely by a strap 57. The nozzle has a channel 51 which terminates in a slidable valve 53 activated by handle 54. Spring 55 normally urges the slidable valve to closed position as shown in Figure 9. Channel 51 communicates with a chamber 58 having a nozzle tip 37 positioned inwardly of its open end. When handle 54 is depressed a fan-shaped stream of dry chemical will be emitted as shown in Figure 10.

The production of a fan-shaped relatively low velocity stream of dry chemical can best be understood by reference to Figure 10, wherein the initial stream 70 of dry chemical suspended in a gaseous medium, such as nitrogen or carbon dioxide, passing through the nozzle is subdivided into a plurality of streams, for example two streams 71 and 72, when using a nozzle tip 37 having the construction shown in Figures 5 and 6. The stream 70 is reduced in velocity as it passes through the circular orifices 38 and is subdivided into two separate secondary streams 71 and 72 substantially circular in cross-section which impinge against the interior surface of the nozzle chamber 58 and which are then redirected essentially forwardly of the mouth of the nozzle and combined into a unitary stream having the contour shown in Figures 7 and 8 and cross-section shown in Figure 10. It is to be noted that the two streams 71 and 72 as they emerge from the mouth of the nozzle do not impinge against each other but rather flow and merge together to produce a fan-shaped stream substantially elliptical in cross-section.

The shape and velocity of the stream emitted from the nozzle are thus predetermined by the construction of the nozzle tip 37. The structure of the nozzle tip 37 shown in Figures 5 and 6 is adapted to provide a fan-shaped stream having the contour shown in Figures 7, 8 and 10A when produced by either of the nozzle constructions previously described. The dimensions shown at the top of the vertical lines in Figures 7 and 8 are the distances from the nozzle mouth and the dimensions given below the top of the vertical lines are the measurement of the stream width at such locations.

The nozzle tip 37 is made of a conical metal plug having a rounded nose as shown in Figure 6 or a pointed nose 40 as shown in Figure 5A made preferably of corrosion-resistant alloy of aluminum and having the sides sloping relatively to each other at an intersecting angle of about 60°. The base of the cone terminates in a relatively short cylindrical portion 43 as shown in Figure 6 which is adapted to be snugly retained in seat 39 of the nozzle as shown in Figure 4. The base of the plug is bored interiorly to provide a hollow interior 42. Two opposed circular orifices 38 are drilled in the exterior conical surface of the plug so as to communicate with the hollow interior of the plug. The orifices 38 are positioned at an angle less than 90° to the longitudinal axis of the plug, preferably at an angle of about 60°, and at right angles to the exterior conical surface. The axes of the orifices shown in Figure 6 are positioned at an intersecting angle of about 60°. The size, number and location of the orifices 38 determine the character and shape of the emitted stream. The location of the nozzle tip 37 in relation to the open mouth of the nozzle will affect and determine the character of the emitted stream. The internal shape and dimensions of the orifice mouth which constitute the impingement surface for the secondary streams are also factors which affect the type of stream emitted. The angle of the axis of the orifices 38 in relation to the internal wall of the nozzle mouth against which the secondary streams impinge will affect the extent and velocity of redirection of the secondary streams. The wall thickness of the plug at the region of the orifices 38 will also affect the character of the secondary streams as well as the final emitted stream. In general it is preferred to have the wall thickness of the plug at the orifice 38 equal to about one-half of its opening diameter. The diameter of the primary channel 36 is also a factor influencing the character of the final emitted stream.

Obviously the previously mentioned factors can be greatly varied over a wide range and must be necessarily coordinated for any given nozzle construction in order to produce a stream of a desired predetermined shape and velocity. The number of orifices in the nozzle tip may also be varied if desired. The use of two orifices previously described will produce a fan-shaped stream having a substantially elliptical cross-section as shown in Figure 10A. In Figure 11 a nozzle tip is shown having three equally spaced circular orifices 38b which will produce a stream having a substantially triangular cross-section as shown in Figure 12. Figure 13 illustrates a nozzle tip having four equally spaced orifices 38c which will produce a stream having a substantially rectangular cross-sectional contour as shown in Figure 14. A nozzle tip having six equally spaced orifices 38d is shown in Figure 15 which will produce a stream having substantially circular cross-sectional contour as shown in Figure 16.

Figure 17 illustrates a further modified nozzle tip construction wherein an orifice 45 is provided at the nose portion in line with the axis of the nozzle tip in addition to the orifices on the conical surfaces of the nozzle tip. Orifice 45 serves to increase the stream velocity of the emitted stream produced by this nozzle tip without substantially changing the fan-shaped contour of the stream.

The contour of the orifices used in the nozzle tips may be varied if desired. For example, in Figures 19 and 20 a nozzle tip is shown having opposed arc-shaped elongated slots 60. In Figures 21 and 22 a pair of spaced rectangular slots 61 are provided in the nozzle tip.

Instead of using a separate nozzle tip which is retained adjacent the mouth of the nozzle it may be feasible to provide a cone-shaped wall or partition adjacent the nozzle mouth integral with the nozzle body convexed outwardly and provided with a suitable number of orifices of the character previously described.

The nozzle of the present invention is particularly adapted for use with dry chemical fire extinguishing equipment. Such equipment for example may consist of a welded steel cylinder holding the dry chemical charge, a cylinder of nitrogen gas which provides the pressure for expelling the dry chemical and 50 ft. of ¾-in. rubber hose equipped with a 3-position shutoff nozzle as shown in Figures 1 to 4 for controlling and directing the flow of dry chemical. As previously explained the nozzle can be shut off, produce a high velocity straight stream, or a low velocity fan stream of dry chemical. The entire assembly is fastened to a suitable carriage mounted on two wheels to permit the extinguisher to be moved about readily.

The extinguishers are normally operated in an upright position. The nitrogen cylinder valve is opened fully and then the dry chemical tank valve is opened. The hose is then removed from the rack and uncoiled for its full length. The nozzle is then opened, usually to the high velocity straight stream position at the start to reduce the fire intensity and bring the fire under control, after which the nozzle is changed to the fan stream position and the fire is then approached more closely, sweeping the flames ahead of the operator by a side-to-side motion of the nozzle to complete the extinguishment. The flames are extinguished by the formation of a blanket of inert gas and water vapor resulting from the decomposition of the dry chemical by the heat of the fire which temporarily cuts off the oxygen supply to the zone of combustion. The approximate maximum effective stream range may vary for example from 35 to 45 ft. for the straight stream and approximately 10 to 15 ft. for the fan stream.

In accordance with the present invention it is possible to control the shape of the stream as well as its velocity to suit the needs for extinguishing fires of different types. Previously attempts have been made to produce fan-shaped streams of dry chemical for extinguishing gasoline and oil fires, but such streams have always been narrow in width and of a high velocity. When using such prior streams they would have a tendency to go through and past the flames to be extinguished without offering adequate and effective means for extinguishing the fire. In accordance with the present invention the shape, direction and velocity of the dry chemical stream is predetermined and regulated to most effectively extinguish the flames because the velocity and shape is controlled to distribute the finely divided chemical at an adequate rate for efficient and effective extinguishment of the fire. By effecting a wide distribution area the dry chemical tends to float on or blanket the fire which is thus quickly and effectively put out.

It is to be understood that numerous changes and modifications may be made in the specific embodiment of the invention herein disclosed

We claim:

1. A nozzle for producing streams of comminuted free flowing materials having a predetermined shape and velocity comprising a chamber opening outwardly, a nozzle tip positioned within said chamber spaced inwardly from the said chamber opening, a plurality of orifices in said nozzle tip to produce individual streams for impingement against the inner walls of said chamber, the inner walls being substantially parallel to the longitudinal axis of said nozzle, said walls redirecting said streams essentially forwardly of the nozzle to join other like redirected streams and to emerge from said chamber while recombining the major portions of the streams outside of the nozzle to form a combined stream, the said orifices in said nozzle tip being positioned at a distance from the said chamber opening to substantially predetermine the shape and velocity of the emitted stream.

2. A nozzle for producing streams of comminuted free flowing materials having a predetermined shape and velocity comprising a chamber opening outwardly, a conical nozzle tip positioned within said chamber spaced inwardly from the said chamber opening, a plurality of spaced orifices in said nozzle tip positioned at an angle less than 90° to the longitudinal axis of said nozzle tip to produce individual streams for impingement against the inner walls of said chamber, the inner walls being substantially parallel to the longitudinal axis of said nozzle, said walls redirecting said streams essentially forwardly of the nozzle to join other like redirected streams and to emerge from said chamber while recombining the major portions of the streams outside of the nozzle to form a combined stream, the said orifices in said nozzle tip being positioned at a distance from the said chamber opening to substantially predetermine the shape and velocity of the emitted stream.

3. A nozzle for producing streams of comminuted free flowing materials having a predetermined shape and velocity comprising a chamber opening outwardly, a nozzle tip positioned within said chamber spaced inwardly from the said chamber opening, two circular spaced orifices in said nozzle tip to produce individual streams for impingement against the inner walls of said chamber, the inner walls being substantially parallel to the longitudinal axis of said nozzle, said walls redirecting said streams essentially forwardly of the nozzle to join and to emerge from said chamber while recombining the major portions of the streams outside of the nozzle to form a combined stream, the said orifices in said nozzle tip being positioned at a distance from the said chamber opening to substantially predetermine the shape and velocity of the emitted stream.

4. A nozzle for producing streams of comminuted free flowing materials having a predetermined shape and velocity comprising a chamber opening outwardly, a partition positioned within said chamber spaced inwardly from the said chamber opening, a plurality of orifices in said partition to produce individual streams for impingement against the inner walls of said chamber, the inner walls being substantially parallel to the longitudinal axis of said nozzle, said walls redirecting said streams essentially forwardly of the nozzle to join other like redirected streams and to emerge from said chamber while recombining the major portions of the streams outside the nozzle to form a combined stream, the said orifices in said partition being positioned at a distance from the said chamber opening to substantially predetermine the shape and velocity of the emitted stream.

ARTHUR B. GUISE.
THEODORE W. JOHNSON.

REFERENCES CITED

The following references are of record in the file of this patent:

UNITED STATES PATENTS

| Number | Name | Date |
|---|---|---|
| 1,483,277 | Broome | Feb. 12, 1924 |

FOREIGN PATENTS

| Number | Country | Date |
|---|---|---|
| 12,660 | Norway | Feb. 15, 1904 |